Dec. 15, 1925.
A. F. KAPTULLER
CLAMP FOR VEHICLE LEAF SPRINGS
Filed July 8, 1922
1,565,856
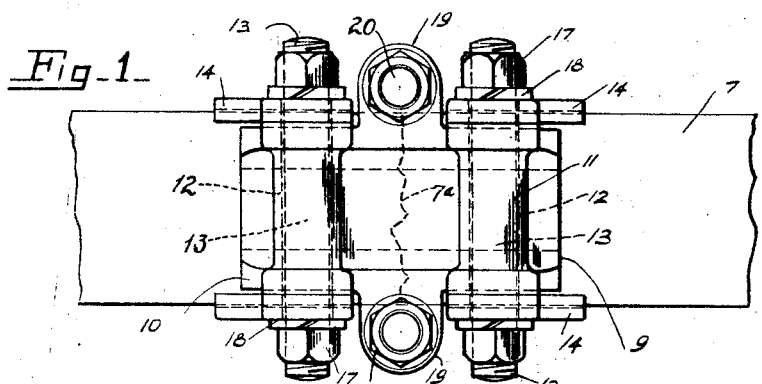
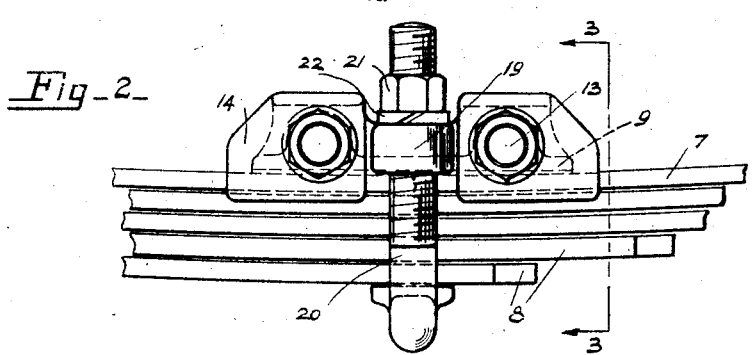
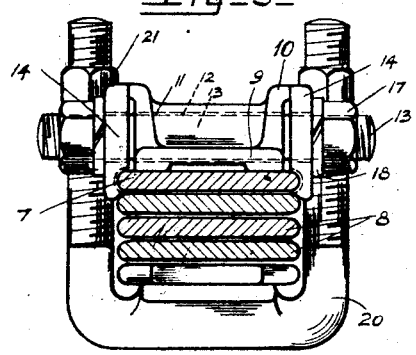 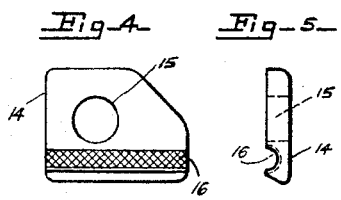
INVENTOR
Alexander F. Kaptuller
By Leslie W. Frick
ATTORNEY Patented Dec. 15, 1925.

1,565,856

UNITED STATES PATENT OFFICE.

ALEXANDER F. KAPTULLER, OF CHICAGO, ILLINOIS.

CLAMP FOR VEHICLE LEAF SPRINGS.

Application filed July 8, 1922. Serial No. 573,617.

*To all whom it may concern:*

Be it known that I, ALEXANDER F. KAPTULLER, formerly a subject of the Emperor of Germany, now a citizen of Germany, residing at Chicago, in the county of Cook and State of Illinois, have invented certain new and useful Improvements in Clamps for Vehicle Leaf Springs, of which the following is a specification.

My invention relates to clamps for vehicle leaf springs.

It frequently happens that the loads placed upon the suspension springs of a vehicle, or the shocks or strains to which the spring is subjected when in use, will cause one or more of the leaves to fracture; usually the longest or master leaf of the spring is the first to fracture. Accidents of this character frequently occur on cross-country trips or at places where immediate assistance is not readily obtainable.

One of the objects of my invention is to provide a clamp of simple and durable construction which may be carried as a part of the equipment of a vehicle and readily applied to a spring having one or more fractured leaves and which will hold the leaves of the spring in normal relationship until the spring can be replaced, or repaired by substituting good leaves for the broken ones.

The invention contemplates a base adapted to be positioned against the face of one of the outer leaves of the spring; and a further object of my invention is the provision of a plurality of members associated with the base in such a manner that they may be brought into binding engagement with the opposite edges of one of the leaves of the spring, means being provided to secure the members in such engagement, whereby longitudinal movement of the spring relative to the clamp is effectively prevented.

The base member is preferably positioned substantially medially with respect to the fracture in the spring; and a more specific object of my invention is the provision of transversely extending bolts associated with the respective ends of the base, shoes being carried on the extremities of each of the bolts so that, when the nuts on the bolts are tightened, the shoes will be drawn into binding engagement with the opposite edges of one of the leaves of the spring.

A further object of the invention is the provision of a base member constructed according to any of the preceding statements and provided with a perforated lug extended laterally from each side thereof in combination with a U-shaped clamping bolt adapted to pass around the spring so that its extremities may project through the respective perforated lugs of the base member whereby the leaves of the spring may be effectively clamped together and the base member of the clamp effectively held against the face of one of the outer leaves of the spring.

The invention consists in the novel constructions, arrangements and devices to be hereinafter described and claimed for carrying out the above stated objects and such other objects as will appear from the following description of a certain preferred embodiment illustrated in the accompanying drawings, wherein—

Fig. 1 is a plan view of a fragmentary portion of a vehicle leaf spring with a clamp embodying the principles of my invention applied thereto;

Fig. 2 is a side elevational view of the parts shown in Fig. 1;

Fig. 3 is a transverse sectional view taken on the line 3—3 of Fig. 2;

Fig. 4 is a side elevational view of one of the shoes adapted to bear against the edge of one of the spring leaves; and Fig. 5 is an end elevational view of the shoe.

Like characters of reference designate like parts in the several views.

Referring now to the accompanying drawings, the clamp is shown as applied to a vehicle leaf spring of ordinary construction and comprising a master leaf 7 and a plurality of additional leaves 8—8.

The base member 9 of the clamp is shown as positioned against the outer face of the master leaf 7. This base member may be of any desired construction but is preferably made with longitudinally extending stiffening ribs 10 and enlarged portions 11 which extend transversely of the base member adjacent its ends, each portion being provided with a bore 12 for the insertion of a threaded stud or bolt 13. The width of the base member at its ends adjacent the bores 12 is somewhat less than the width of the leaves of the spring for which the clamp is designed. Shoes 14 provided with apertures 15 are carried on the respective extremities of each of the bolts 13. These shoes are provided with longitudinally extending concave bearing surfaces 16, see Figs. 4 and 5, which are adapted to be brought into effective binding engagement with the opposite edges of the master leaf 7, the surfaces 16 preferably being knurled or corrugated to more effectively bite into the edges of the leaf. Nuts 17 are threaded on the extremities of the bolts 13, and a lock washer 18 is preferably interposed between the respective shoes 14 and nuts 17 to prevent the nuts 17 from working loose. It will be obvious upon tightening the nuts 17, that the shoes 14 will be forced into effective holding engagement with the opposite edges of the master leaf. The perforations 15 of the respective shoes 14 are preferably made somewhat larger in diameter than the bolts 13, and since the shoes may move independently of the base member, they may readily adjust themselves to take care of any inequalities in width of the spring leaf or any unevenness in the surface edges of the leaf that may be present due to imperfections in manufacture.

In applying the clamp to the spring, the base member is preferably positioned on the spring so that the fracture 7ª in the leaf will be substantially medially with respect to the clamp. When the nuts 17 are tightened, the shoes 14 are forced into binding engagement with the edges of the broken leaf and the clamp effectively holds the two parts of the broken leaf in normal relation to the other leaves of the spring, longitudinal movement of one part of the broken leaf relative to the other part being effectively prevented.

The base member is preferably provided with perforated lugs 19 extending laterally from its respective sides, the perforations being adapted to receive the extremities of a U-shaped clamping bolt 20. The clamping bolt 20 is adapted to be passed around the several leaves of the spring, and after its legs are inserted through the perforations in the lugs 19, nuts 21 are threaded thereonto thereby effectively holding the base member against the face of the leaf 7 and also holding the other leaves of the spring firmly together. Lock washers 22 may be placed on the legs of the bolt 20, being interposed between the lugs 19 and the nuts 21 to prevent the nuts from working loose.

I do not intend to limit my invention to the details of constructions, arrangements and devices shown and described except only in so far as certain of the appended claims are specifically so limited, as it will be obvious to those skilled in the art that modifications may be made without departing from the spirit of my invention.

I claim:

1. A clamp for vehicle leaf springs comprising a base adapted to be positioned against the face of one of the outer leaves of the spring, self positioning members associated with the respective sides of said base and adapted to bear against the opposite edges of one of said leaves, and means to secure said members in binding engagement with said leaf.

2. A clamp for vehicle leaf springs comprising a base adapted to be positioned against the face of one of the outer leaves of the spring, said base having threaded means extending transversely from each side thereof, shoes adapted to slip over said respective threaded means, and clamping nuts on said threaded means whereby said shoes may be brought into binding engagement with the opposite edges of one of said leaves, for the purpose specified.

3. A clamp for vehicle leaf springs comprising a base adapted to be positioned against the face of one of the outer leaves of the spring, a bolt transversely associated with said base, and shoes carried on the respective ends of said bolt, whereby upon tightening the nut on said bolt said shoes are brought into binding engagement with the opposite edges of one of said leaves, for the purpose specified.

4. A clamp for temporarily repairing a fractured leaf of a vehicle leaf spring comprising a base adapted to be positioned against the face of one of the outer leaves of the spring and substantially medially relative to the fracture, bolts transversely associated with the respective ends of said base, and shoes carried on the respective ends of said bolts, whereby upon tightening the nuts on said bolts said shoes are brought into binding engagement with the opposite edges of one of said leaves, for the purpose specified.

5. A clamp for vehicle leaf springs comprising a base adapted to be positioned against the face of one of the outer leaves of the spring, means surrounding the spring and connected with said base for holding said base against said outer leaf, self-positioning members associated with the respective sides of said base and adapted to bear against the opposite edges of one of said leaves, and means to secure said members in binding engagement with said last-named leaf.

6. A clamp for vehicle leaf springs comprising a base adapted to be positioned against the face of one of the outer leaves of the spring and having a perforated lug extending laterally from each side thereof, a U-shaped clamping bolt adapted to pass around the spring with the respective legs thereof passing through the perforations in said lugs, said base having threaded means extending transversely from each side thereof, shoes adapted to slip over said respective threaded means, and clamping nuts on said threaded means whereby said shoes may be brought into binding engagement with the opposite edges of one of said leaves, for the purpose specified.

7. A clamp for vehicle leaf springs comprising a base adapted to be positioned against the face of one of the outer leaves of the spring and having a perforated lug extending laterally from each side thereof, a U-shaped clamping bolt adapted to pass around the spring with the respective legs thereof passing through the perforations in said lugs, a bolt transversely associated with said base, and shoes carried on the respective ends of said bolt, whereby upon tightening the nut on said bolt said shoes are brought into binding engagement with the opposite edges of one of said leaves, for the purpose specified.

8. A clamp for temporarily repairing a fractured leaf of a vehicle leaf spring comprising a base adapted to be positioned against the face of one of the outer leaves of the spring and substantially medially relative to the fracture, said base having a perforated lug extending laterally from each side thereof, a U-shaped clamping bolt adapted to pass around the spring with the respective legs thereof passing through the perforations in said lugs, bolts transversely associated with the respective ends of said base, and shoes carried on the respective ends of said bolts, whereby upon tightening the nuts on said bolts said shoes are brought into binding engagement with the opposite edges of one of said leaves, for the purpose specified.

9. In a spring repairing device, clamping elements adapted to embrace the edges of a leaf of a spring bridging a fracture of the spring, a plate adapted to bridge the said fracture and having engagement with the clamping elements whereby the plate is held in assembled relation to the clamping members, and means for drawing the said clamping members into engagement with the edges of the said spring.

10. In a spring repairing or reinforcing device, the combination of a plate, clamping elements independent of but adapted to be positioned at each side edge of the plate, and means for drawing the clamping elements into engagement with the edges of a spring, said plate and means being cooperatively arranged to prevent slippage of the clamping elements with respect to the plate.

11. In a spring repairing or reinforcing device, the combination of a plate, spaced clamping elements independent of but adapted to be positioned at each side edge of the plate, means carried by the plate for drawing the clamping elements into engagement with the edges of a spring, and means at the respective sides of the plate and between the clamping elements on the respective sides of the plate for holding against the plate that part of the spring which lies between said clamping elements.

12. In a spring repairing or reinforcing device, the combination of a plate, two spaced transversely extending bolts carried by the plate, clamping elements at each side edge of the plate on said respective bolts whereby said clamping elements may be drawn into engagement with the edges of a spring, and means at the respective sides of the plate and between the clamping elements on the respective sides of the plate for holding against the plate that part of the spring which lies between said clamping elements.

ALEXANDER F. KAPTULLER.